United States Patent [19]

Francavilla

[11] 3,966,055
[45] June 29, 1976

[54] DISPLAY HOLDER FOR DENTAL MATERIALS

[76] Inventor: Vincent J. Francavilla, 140 Kenmore Ave., Buffalo, N.Y. 14226

[22] Filed: June 14, 1974

[21] Appl. No.: 479,276

[52] U.S. Cl. .............................. 211/65; 248/109; 248/111; 248/DIG. 8
[51] Int. Cl.² ...................................... A47B 81/02
[58] Field of Search ........... 211/65, 66; 248/DIG. 8, 248/108, 109, 110, 111, 113; D6/114, 125

[56] References Cited
UNITED STATES PATENTS

| | | | |
|---|---|---|---|
| 2,099,906 | 11/1937 | Reese et al. | 211/65 |
| 2,415,447 | 2/1947 | Stanton | 211/65 |
| 2,779,560 | 1/1957 | Springer | 248/111 |
| 2,937,910 | 5/1960 | Randa | 248/113 |
| 3,170,265 | 2/1965 | Goldfarb | 248/111 |
| 3,178,060 | 4/1965 | Bossack | 248/109 |
| 3,450,269 | 6/1969 | Simeti | 248/113 |

Primary Examiner—Roy D. Frazier
Assistant Examiner—Robert A. Hafer
Attorney, Agent, or Firm—Raymond F. Kramer

[57] ABSTRACT

A display holder, useful as a children's dental hygiene teaching aid and adapted to hold three or more different but related functional articles, such as toothbrushes, tubes of toothpaste and dispensers for dental floss, includes a display surface having a scene depicted thereon such that parts of the scene relate to and are adapted to include the functional articles, when held in place therein, to participate in and complete the scene, and has means for holding the functional articles in place with respect to the display surface so that they participate in and complete the scene depicted. Preferably the display holder is made of a pair of three dimensional film plastic forms, made by vacuum forming of sheet materials, which are held together, the scene is that of a tooth, representing a castle, and includes as parts of the scene means for holding a toothbrush, tube of toothpaste and dispenser, of dental floss, all of which represent decay fighters or weapons used to protect against tooth decay.

6 Claims, 8 Drawing Figures

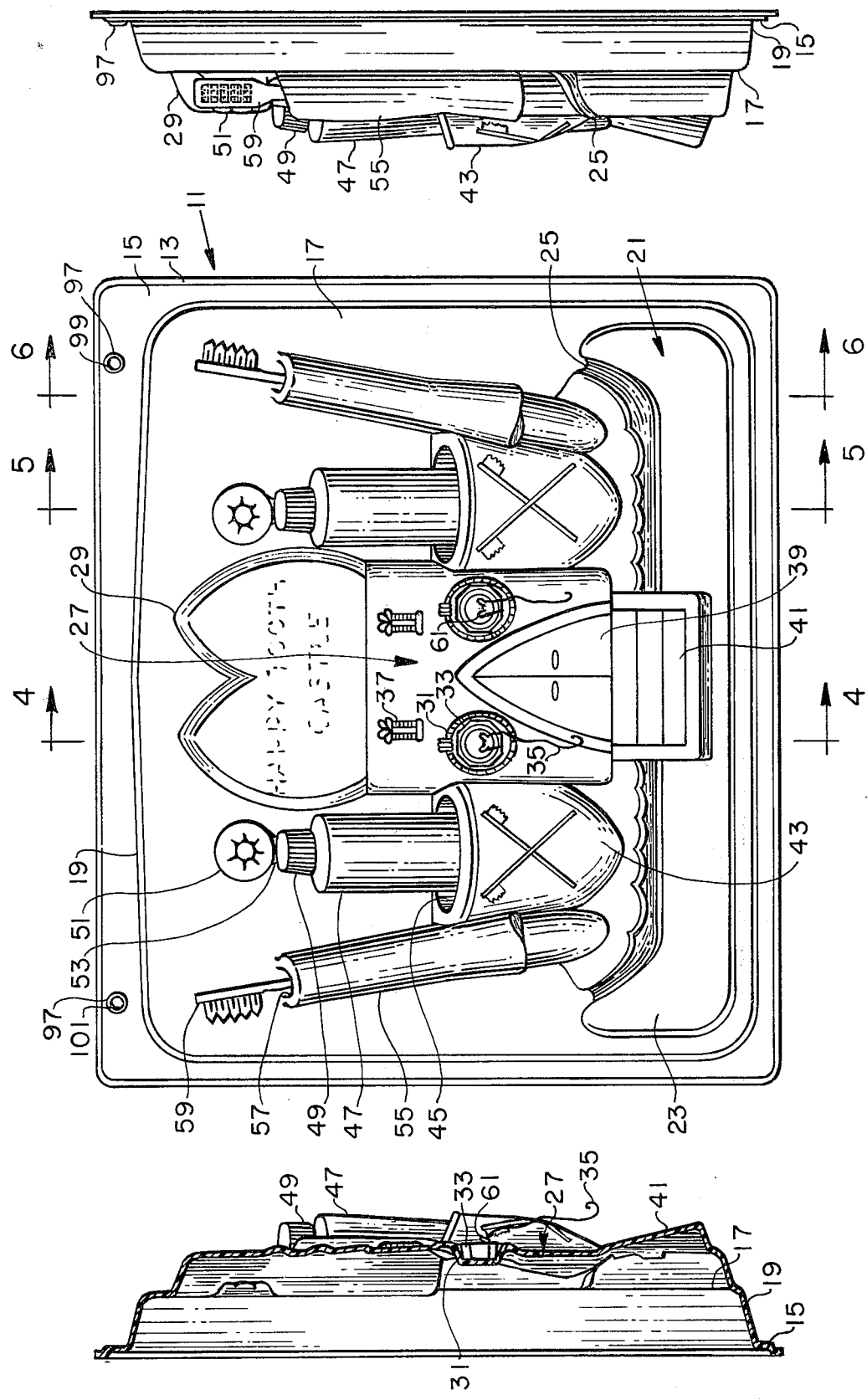

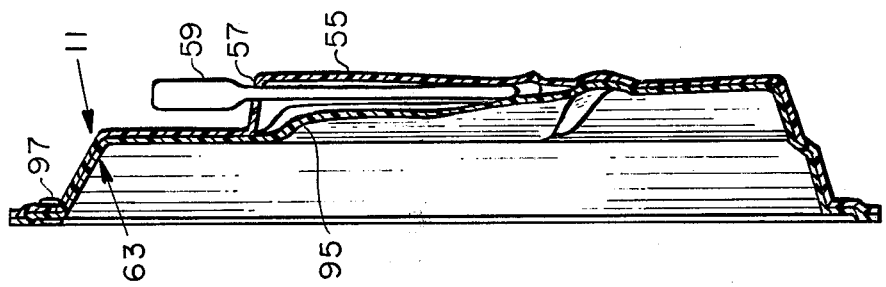
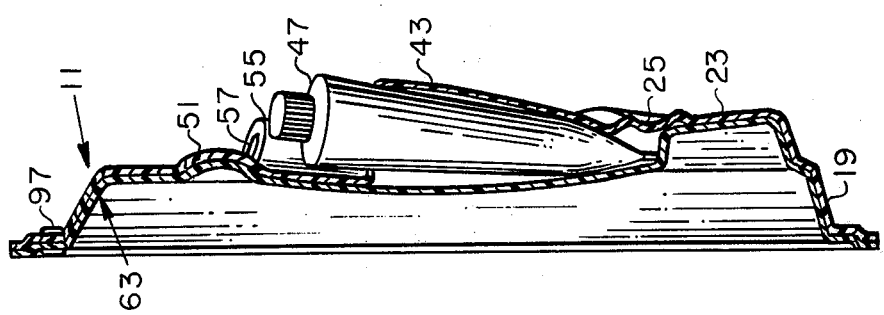

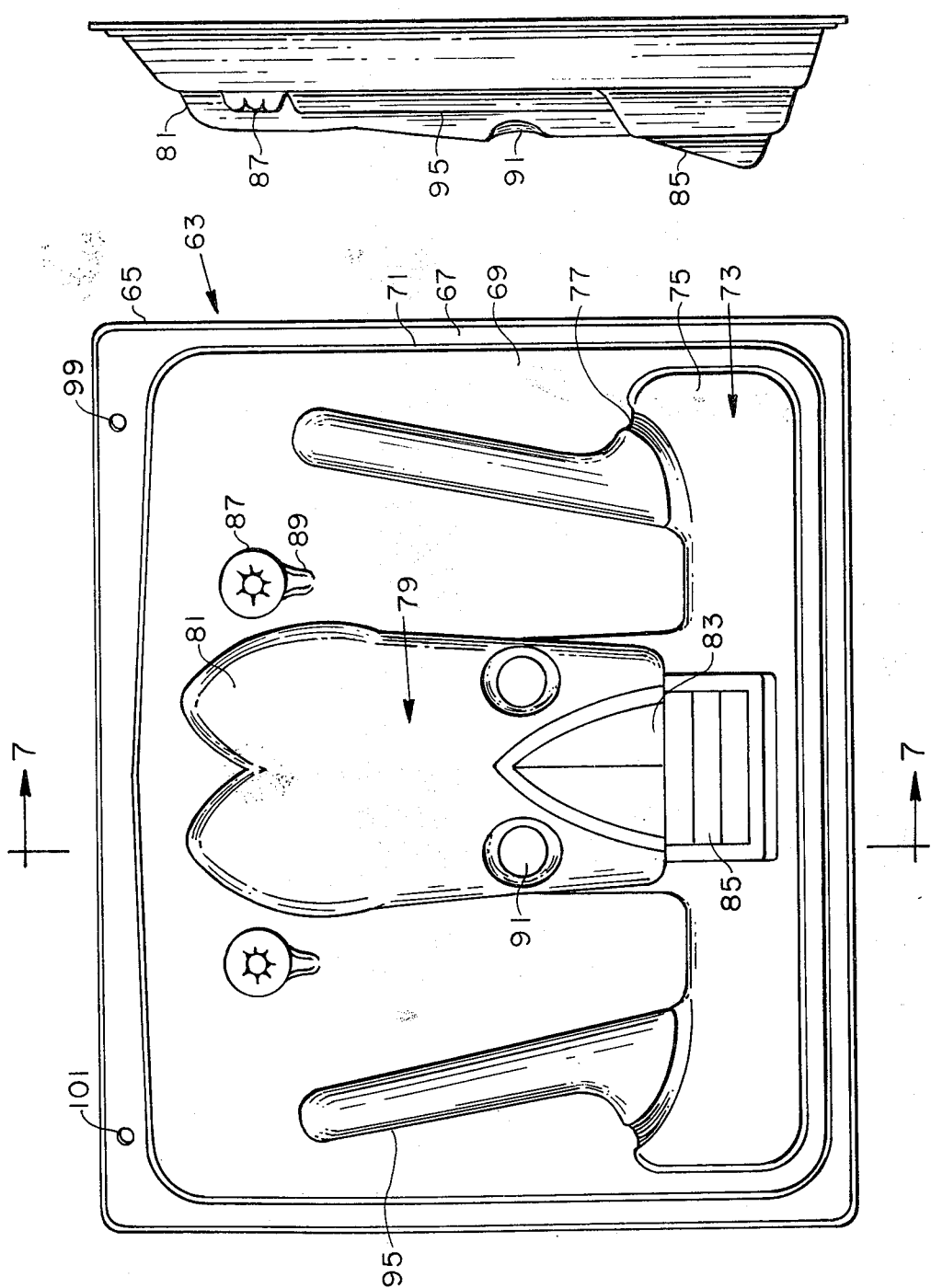

DISPLAY HOLDER FOR DENTAL MATERIALS

Dental science today can prevent or substantially inhibit tooth decay. However, for the most part decay prevention depends upon the individual who must conscientiously apply a program of oral hygiene and obtain regular professional care. Children are more susceptible to the development of dental caries than adults and may omit brushing their teeth and using dental floss unless reminded and motivated to do so. Motivational aids have been made in the past to encourage brushing the teeth and some of these have been effective. However, none of the aids of the prior art included dental floss along with toothbrush and toothpaste and none provided a display holder for the dental floss, toothbrush and toothpaste which would have the capability of uniquely and integrally motivating a child to utilize all three materials and thereby achieve caries prevention by use of the decay-preventive dentifrice in a conscientiously applied program of oral hygiene and regular professional care. Furthermore, none of the prior art items included a decorative scene, attractive in appearance and appealing to a child, in a product which is inexpensive to manufacture and can be readily installed on a bathroom wall where it serves as a continual reminder to the child to brush his teeth and remove food particles and tartar from them with dental floss. Also, although display holders have been made in the prior art none are known which include two three-dimensional members, made by vacuum forming sheet materials, which members are joined together in such a manner as to be complemented and thereby strengthened (although they are made of very thin material) and provide recesses or compartments therein for utilitarian articles, such as toothbrushes, tubes of toothpaste and dispensers of dental floss.

It is an object of this invention to provide a display holder which can be inexpensively manufactured of readily available materials and which can serve as an effective holder for health care and other utilitarian items, while attractively displaying them. It is another object of the invention to provide means for reminding and motivating a child to brush his teeth and use dental floss. It is also an object of the invention to produce an integral decorative display holder or wall plaque including utilitarian articles, such as the dental materials described, as participating components of the holder or plaque and a scene depicted thereon. It is a further object to provide such a holder and scene which relate to a story to be read to the child or which he may read himself, which describes a fight against tooth decay. It is still another object of the invention to provide a wall plaque for dentists' waiting rooms and offices containing recommended toothbrushes, toothpastes and dental flosses so as to suggest to the child the use of these materials to avoid tooth decay and gum diseases.

In accordance with the invention there is provided a display holder for at least three related functional articles for care of a part or parts of the body which comprises a display surface on which is depicted a scene, the elements of which include parts adapted to relate to the functional articles, which functional articles, when in place, participate in and complete the scene, and means associated with the display surface for holding the functional articles in place so as to participate in and complete the scene. In preferred embodiments of the invention the display holders are of thin synthetic organic polymeric material vacuum formed to three dimensional shapes which conform to and strengthen each other and produce compartments for holding the various functional articles, the articles include at least one toothbrush, at least one tube of toothpaste and at least one dispenser of dental floss and the scene depicted is that of a castle with a knight holding a lance, with a shield in front of him and having a means for dispensing rope incorporated in a wall of the castle. Also within the invention are display holders of the type described, useful for holding other utilitarian items. The invention also relates to processes for making such holders.

The invention will be readily understood from the following description thereof, taken in conjunction with the drawing, in which there is illustrated a perferred embodiment, in which drawing:

FIG. 1 is a front elevation of the display holder or wall plaque, containing a pair each of toothbrushes, tubes of toothpaste and dispensers of dental floss;

FIG. 2 is a front elevation of the backing member of the wall plaque;

FIG. 3 is an end elevation of the display holder with a toothbrush and a tube of toothpaste held therein;

FIG. 4 is a vertical section of the front member of the display holder along plane 4—4 of FIG. 1;

FIG. 5 is a partial vertical section of the assembled display holder along plane 5—5 of both FIGS. 1 and 2, wherein the tube of toothpaste is not shown in section and wherein the toothbrush is omitted for clarity;

FIG. 6 is a vertical section of the assembled display holder along plane 6—6 of both FIGS. 1 and 2;

FIG. 7 is a vertical section along plane 7—7 of FIG. 2; and

FIG. 8 is an end elevation of the backing member of FIG. 2.

FIG. 1 illustrates the appearance of the present display holder and shows essentially the only portion of the display holder or wall plaque, other than the ends, visible to a viewer. Display holder 11, made of thin vacuum formable ABS plastic (0.020 inch in thickness), includes narrow flange 13, a flat background portion 15 and a forwardly extended (considering the holder to be positioned vertically) raised portion 17 having a tapered wall 19 connecting it to the flat background, and a scene 21 thereon. The scene, as illustrated, includes a grassy field portion 23, a moat 25 and a castle 27, the upper portion 29 of which is in the shape of a molar symbolizing an impregnable tooth which is kept that way by effective use of dentifrice, toothbrush and dental floss against the forces of tooth decay. Shown on the castle are recesses or hollow dispenser holders 31 into which dispensers 33 for floss 35 are removably press fitted. Also parts of the castle are windows or firing ports 37, doors 39 and a drawbridge 41. Outside the castle are depicted shields 43 having walled openings 45 behind them, in which are mounted or held toothpaste tubes 47, representing the bodies of knights, with the tube caps 49 representing their helmets. Atop the helmets are plumes 51, the lower portions of which 53 may serve to press against the toothpaste tube caps and position the tubes in the holders therefor. Alongside the shield-receptacle for the knight-toothpaste tube is a receptacle 55 simulating a lance or lance handle, with an opening 57 at the top thereof through which a toothbrush 59, simulating the end of the lance, projects.

As described above, the functional wall plaque includes castle means resembling a tooth, which castle is defended by a toothpaste tube knight having a toothbrush lance to employ against the enemies of tooth health and to assist in lassoing of or tying down such enemies there is also present dental floss rope 35. To use the various dental hygiene articles is is preferred that they all be removed from the holder and subsequently replaced. Thus, the toothpaste tube is removed, the cap is taken off, paste is applied to the brush and the teeth are brushed to clean them. Either before or after brushing, dental floss may be used in the approved fashion, holding it taut and pressing upwardly past the gum line, to remove food particles and tartar from the teeth near the gum line. The particular dental floss dispenser shown, represented by numeral 33, is one which contains about sixty yards of unwaxed dental floss which may be severed from the spool, not illustrated, in dispenser 33 by pulling it against cut-off tab 61. Other types of dental floss dispensers may be employed and in some embodiments of the invention the dispensers may be held in position behind windows or firing slits 37, with the dental floss being dispensed through openings (not illustrated) therein. In such cases, the front and back vacuum formed plastic members will be so shaped as to retain the dental floss dispenser and the floss may be cut with scissors or a knife or there may be included adjacent the window cut-off means resembling a knife edge or tab 61, which may be cemented to the front plastic portion by a strong cement, such as an alpha-cyanoacrylate cement or may be held thereto by other suitable means.

The display holder is adaptable for holding toothpaste tubes of different sizes and toothbrushes of different lengths. If the toothpaste tube employed is too short to make an effective appearing plaque, padding or stuffing may be used inside the shield receptacle to elevate the tube to proper position. If the toothbrush is too short, the bristles thereof can rest against the top of lance handle receptacle 55 whereas, if the brush is longer, it would rest against the bottom of the compartment and merely result in a lance of greater length. As illustrated, the holder for the dental floss dispenser is substantially circular, the dispenser, which is octagonal, is press fitted into the holder and the resiliency of the plastic of the front panel member, reinforced by the backing member, holds the dental floss in place satisfactorily until removal for use is desired. However, it is within the invention to have the holder interior and dispenser exterior matched in shape or at least partially matched, as by having the holder 31 octagonal in shape, flattened at appropriate sides to match the dispenser 33 or otherwise adapted for closer fit therewith. To make the holder adaptable for different dispensers of somewhat different measurements there may be employed cushioning means therein, such as a single sided or double sided piece of tape, preferably made of a cushioning soft material, such as polyurethane or vinyl plastic, which may be foamed for additional cushioning effect, or other suitable substitute. The tape may hold the floss dispenser 33 adhesively or by pressure and may hold it so tightly as to enable floss 35 to be removed therefrom and cut on tab 61 (providing that the tap is sharp enough) without removal of dispenser 33 from holder 31.

In FIG. 2 vacuum formed thin plastic member 63 is illustrated. This includes a matching narrow flange section 65, adapted to fit the front member flange section 13, matching flat background portion 67 and forwardly extended raised portion 69 having a tapered wall 71 connecting it to the flat background, all of which parts conform to and contact the corresponding parts of the front member when assembled ready for use.

On back panel 63 there is to a substantial extent a conforming replica of "scene" 21, hereby designated by numeral 73. Scene 73 includes a portion 75 corresponding to grassy field portion 23 of the front member, moat 77 and castle 79, the upper portion 81 of which matches the upper portion 29 of castle 27. Similarly, the rest of the tooth matches the tooth castle shape of the front panel, including doors 83 and drawbridge 85. It will be noted that due to the conforming and contactings of various parts over at least half and preferably over a substantial proportion, e.g., over 75%, of the possible contact area, the plaque is strengthened. Such a strengthening is further increased by further utilization of rib and channel sections, such as the moat sections 25 and 77, which in essence form reinforcing ribs in otherwise flat thin plastic members. Additional strengthening is obtained by plume member 87 and lower portions 89 thereof, which correspond to plume parts 51 and 53 of the visible portion of the wall plaque. Similar desirable reinforcing effects are obtained by the steppings up of the background and "grassy field" portions. Even the grooves in the drawbridge and in the castle door sections, which match, provide better conformances and reinforcements of the tube panels without the use of cement therein and improve adhesion of the parts together when cement is deposited in or adjacent to the grooves. Incidentally, it will be noted that the shape of the door in the front panel is such as to reinforce the impression of the castle as resembling a tooth, with the lower portions thereof on the sides of the door representing the roots. Of course, additional strengthening can be obtained by utilizing thicker vacuum formable sheets, employing more rigid plastics and using greater numbers of sheets laminated or otherwise fastened together, either before or after shaping. However, it has been found that the two sheets utilized to make the present devices are normally sufficient to produce a strong form-retaining product.

The holding means for supporting dental floss, toothbrush and toothpaste tube are also provided in conjunction with the front panel by shaping the back panel so as to form a receptacle for the toothbrush and toothpaste tube and shaping it in such a way as to strengthen the receptacle already provided for the dental floss dispenser. Thus, recessed portions 91 are provided in the back panel to match with and preferably, to be cemented to the recesses of the front panel, so that the walls of the front panel recesses are enclosed by those of the back panel recesses. Toothbrush receptacle sections 95 are provided to project into the receptacles 55 of the front panel, thereby narrowing them somewhat and providing better holding means for the usual thin handles of toothbrushes. To form the backing of the dentifrice tube receptacle 43 of the front panel no special configuration of the back panel is required, since the tube is satisfactorily confined behind the shield-receptacle in the walled opening 45 between the top of said shield and the back thereof and may lean against background wall 69.

To support the wall plaque or display holder grommets 97 are used to join together front and back members 11 and 63 and to provide openings 99 and 101 therein for passage of screws or nails, which may be used to affix these to walls or other surfaces. Alternatively, two-sided pressure sensitive tapes may be employed to hold the back of the display holder to a wall or other surface, and other holding means may also be used.

In FIGS. 5 and 6 are shown at least partially sectioned views in which the joining together of the back and front members is illustrated, together with the formation of the toothbrush and toothpaste tube cavities and the fittings of those articles therein.

As illustrated, the display holder is for two sets of tooth care aids. Of course, the design of the product may be modified to accommodate one, three, four or more sets of such functional equipment, or if desired, a plurality of toothbrush holders may be present, with only a single receptacle for the toothpaste tube and another single receptacle for the dental floss dispenser being employed.

The manufacture of the present display holders is a comparatively simple procedure, following these instructions. First, the desired forms are produced with modeling clay or similar material or plaster and then, if clay or such material has been used, plaster forms are made from the sculpture. The plaster forms are then placed in a standard vacuum forming machine, a sheet of plastic to be vacuum formed is placed on the form, the machine cover is closed and vacuum is applied, together with heat, forcing the sheet tightly against the surface of the plaster, after which the cover is removed and the formed sheet is allowed to cool. The plastics utilized are thermoplastics and become readily sufficiently softened at the elevated temperature of the machine to be easily formable, while yet retaining their continuity as a sheet. In some cases, when thermosetting plastics are used, the heat employed may set the plastic material. In either instance, the final product obtained is form-retaining and although somewhat flexible due to its thinness (and maybe so flexible as to be useless for the present purposes) can be rigidified by being joined to a matching or substantially matching form, such as by joining a front to a back display holder member. Either before or after joining the members together, which joining is effected by application of rivets, staples, grommets or cement, or by heat sealing, openings 45 and 57 may be cut out. The sealing is effected over a sufficiently large proportion of the contacting surfaces of the two members so as to satisfactorily rigidify the product by cementing and/or by properly spacing grommets, rivets, staples or other fasteners on the article and preferably, unobtrusively. However, in some cases they may participate in the scene. The plastic employed is preferably ABS sheet but generally various other vacuum formable sheet plastics may also be utilized. Similarly, the cements will normally be rubber cements but various other adhesives may be used and these will be mentioned later. The grommets employed are preferably brass but aluminum, steel and various other metals and polymeric materials can be substituted. Upon completion of the assembly the display holders are ready for insertion of the utilitarian articles and for fastening onto a suitable wall or other surface.

To conserve shipping space and to protect the elements of the display holder, the two portions thereof may be packed separately, preferably nesting the forms for each portion, and may be assembled by the purchaser. For such assembly it may be desirable to provide clip or other fasteners for holding the sides of the units together, which may be removable at will. Also, doubly coated pressure sensitive tapes may be employed to hold inner portions of the assembly together.

The thermoformable sheet material employed is preferably of acrylonitrile-butadiene-styrene (ABS) in sheet form, which also may be employed as a laminate with other suitable plastic materials. Mixtures of polyvinyl chloride (PVC) with ABS may be used, as may be mixtures of ABS and polycarbonates. However, usually the ABS resins alone are satisfactory and the physical properties thereof make them especially useful for producing the present display holders. They are also easily painted or decorated. Instead of ABS, various other thermoformable plastics may be employed, such as cellulosic sheets, including cellulose acetate butyrate, cellulose triacetate and cellulose propionate, acrylics, fluoroplastics, polycarbonates, polyethylenes, polypropylenes, polyesters, polystyrenes, polyurethanes, PVC and various composites. The thicknesses of such materials are usually from 5 to 50 mils, preferably from 10 to 30 mils and most preferably about 20 mils. The various materials employable are described in the 1973–1974 Modern Plastics Encyclopedia in Vol. 50, No. 10A (hereafter referred to as MPE) at pages 151–187. Mentioned MPE disclosures are hereby incorporated by reference so as to minimize the need for lengthy descriptions of useful plastics, processing operations, etc. The described products, in sheet form, may be thermoformed in the normal manner according to the methods described in MPE at pages 445–452. The preferred method utilized is straight vacuum forming but other molding methods for producing the present articles and parts thereof may also be used. The various adhesives described at MPE pages 480–481 may be employed, as may be the methods of bonding described subsequently, at pages 482–490.

Although rubber cements and epoxy resin cements are preferred for fastening together the molded sheets to form the present display holders, other adhesives may also be employed, such as those described at pages 480–481 of the encyclopedia mentioned. Similarly, solvent bonding may be effected where feasible and in some instances heat sealing, electromagnetic induction bonding, high frequency sealing, welding and various other techniques, including mechanical fastening, may be utilized, either alone or in conjunction with one another. Normally, when adhesives are employed, the thickness of the adhesive film between the plastic sheet parts will be small, usually from 0.1 to 10 mils, preferably from 0.5 to 5 mils. It is preferred to employ fast sealing cements or adhesives, to improve production rates, and hot melt adhesives are useful.

After production of the formed display holder part it may be attractively decorated, as by painting or flocking. Painting is described at pages 524–528 of MPE or, before molding, the sheet may be printed, by methods described at MPE pages 528–532, with care being taken that the printing allows for the distortion of the sheet plastic during manufacture of the vacuum formed part. In the painting of the holder visible surface, various masks may be employed and in some instances, in addition to brush and spray painting and stamp imprinting of the product, finger paints may be utilized. In one version of the present device, the display surface is marked for paint-by-number painting by the child who is to use the display holder. Alternatively, only some parts of the holder are painted or otherwise decorated by the child. Of course, before painting or otherwise decorating the molded items, any mold release compounds employed should usually be removed. Painting or decorating may be effected either before or after the two-part molded display holder is assembled. If it is effected before assembly the front part may be rested on a matching form to minimize the chance of perforation or bending thereof during the painting.

After manufacture of the display holder it is shipped for sale to the ultimate consumer, either assembled or disassembled. Preferably, there will be furnished with the display holder a story book or pamphlet relevant to the subject depicted in the display. For example, when the display is as illustrated in the drawings, the story may be about the defense of the happy tooth castle against the demons or dragons that represent tooth decay. The child becomes interested in the story, in which the castle is successfully defended by the toothpaste tube knight using his toothbrush lance and dental floss lasso or rope, and the child is encouraged thereby to participate in the fight by using the dentifrice, brush and dental floss. Such books may also double as coloring books, with the child decorating the illustrations in the story and with such illustrations closely resembling those of the display holder. Actual experience in testing the use of the present holder shows that it greatly encourages young children to follow sound dental practice and to do so regularly. Of course, when the items held relate to the care of other body parts, e.g., soap and brush, comb and hairbrush, nail file and clipper, the story is adapted to relate to the correct usage of such materials. In addition to using a book or pamphlet teaching aid, slides, film strips, instruction cards, etc., may also be provided.

The following example illustrates the invention but does not limit it.

EXAMPLE

Using a Plexi-Lite thermoforming machine, Model 4040, made by Production Products, Inc., Minneapolis, Minnesota, adapted for automatic or manual use, there are manufactured, by an ordinary thermosetting production method, using automatic control, the front and backing members shown in FIGS. 1 and 2. For their manufacture 20 mil thickness high impact polystyrene sheets, measuring about 15 inches by 17 inches, are placed inside the machine, with the appropriate form in place, the plastic is heated to a sufficiently high temperature, e.g., 300°–500°F. to promote the desired degree of distortion during vacuum forming, and a vacuum of about 27 inches of mercury is drawn through the form, pulling the sheet into intimate contact with it. Subsequently, the formed plastic sheet is cooled and is withdrawn from the machine. For the front panel, the openings for insertion of the dentifrice tubes and the toothbrushes are cut out, as by machine punching. The sceen is then painted on the front panel, as by spray painting, with finger- and brush-painting touchups of some portions thereof, utilizing an acrylic paint. Then, the back and front forms are treated with xylol solvent around the contact-making peripheries thereof and are pressed together to fasten the members together, after which ¼ inch inside diameter grommets are fastened to the top corners.

In use, the display holder is fastened to a wall surface by screws through the holes in the upper corner grommets. Toothbrushes, dental floss holders and tubes of dentifrice are positioned in the holder, completing the scene. Then, the child reads or is read a story about the scene and is encouraged to use the held articles which relate to items or persons in the story. It is found that because toothbrushing is made more interesting (being relevant to a pleasurable story), the child is motivated to brush his teeth and to use dental floss, and performs these functions more regularly and more effectively.

In place of the high impact polystyrene sheet, ABS sheets and other thermoplastic sheet materials are utilized, of thicknesses ranging from 10 mils to 40 mils, and satisfactory products are made. Instead of using a solvent to fuse the outer edges of the parts together, a rubber cement is employed (and in some cases an epoxy cement) with similar good results. The center portions of the display holder are held together by applying such cement interiorly, too and in some cases by use of foamed polyurethane or other tape material, coated with pressure sensitive adhesive on both sides thereof. The dental floss holders are maintained in position by use of a similar single or double sided, pressure sensitive, adhesive covered, foamed plastic or other material. Such a holder is fastened to a tile wall, utilizing similar foamed or unfoamed polyurethane, polyester or polyvinyl chloride tape, with pressure sensitive adhesive on both sides thereof. In all such cases, the display is stable and sufficiently strong to withstand normal usage and holds tightly to wall or other surfaces to which it may be fastened.

The invention has been described with respect to illustrations and examples thereof but is not to be considered as limited to these because it is evident that one of skill in the art will be able to utilize substitutes and equivalents without going beyond the scope of the invention.

What is claimed is:

1. A display holder, adapted to be held vertically in use, holding and displaying a toothbrush, a container of dentifrice and a dispenser of dental floss at particular indicated locations therein, which comprises a pair of unitary synthetic organic polymeric plastic three-dimensional front and back members of vacuum formed sheet material of a thickness between 5 and 50 mils, inclusive, each of said members having first areas which conform with and contact similar areas on the other member, said members being fastened together at said first areas so as to rigidify the display holder, said members having second areas which are spaced from each other and form compartments therein between them for at least the toothbrush and container of dentifrice, which compartment for the dentifrice supports the container thereof resting on its bottom, the front member having a scene depicted thereon including a representation of a fighter against tooth decay and a weapon for use in such fight wherein the container of dentifrice participates and represents at least a part of said fighter against tooth decay and the toothbrush participates and represents at least a part of said weapon when the container of dentifrice and toothbrush are held in the display holder at their particular indicated locations.

2. A display holder according to claim 1 wherein there are matching recesses in the front and back members in which the dispenser of dental floss is held, with an inner wall of the recess in the back member enclosing and contacting an outer wall of the recess of the front member to rigidify the front member recess wall.

3. A display holder according to claim 2 wherein the scene depicted on the front member thereof is one related to the defense of the teeth against tooth decay in which a moated castle represents a tooth, the container of dentifrice is a tube of toothpaste which represents a knight, a portion of the front member for supporting the tube of toothpaste represents a shield, a toothbrush represents a part of a lance, a portion of the front member for supporting the toothbrush represents a lance handle, the dental floss in the container represents a rope and a holder in the front member for holding the dispenser of dental floss represents an aperture in a wall of the castle, so that proper return of the tube of toothpaste, toothbrush and dispenser of dental floss to the display holder after use thereof is facilitated by identification of each of said items with its respective portion of the scene.

4. A display holder according to claim 3 which includes at least two toothbrushes, at least two tubes of toothpaste and at least two dispensers of dental floss and respective holding means therefor and in which the vacuum formed synthetic organic polymeric plastic material is an acrylonitrile-butadienestyrene polymer.

5. A display holder according to claim 4 wherein the front member is shaped to produce four forwardly projecting hollows therein for supporting the two tubes of toothpaste and two toothbrushes in cooperation with the backing member and the backing member is shaped so that it enters at least part way into said hollows and is joined to the walls thereof to produce compartments for holding the toothpaste tubes and toothbrushes, to strengthen said walls of the compartments so formed and to diminish the sizes of the compartments so as to make them better adapted to hold the described items.

6. A display holder according to clsim 5 wherein the front and back members conform with and are contactable with each other over first areas which cover at least half their facing surfaces, which is strengthened by conforming rib and channel sections in said first areas of said front and back members and about the periphery of which is a flange, made from conforming flanges in said first areas of said front and back members, which is suitable for fastening to a vertical wall by a pressure sensitive adhesive.

* * * * *